(No Model.)
E. N. DICKERSON, Dec'd.
E. N. DICKERSON, Jr. and C. W. GOULD, Executors.
VALVE GEAR.
2 Sheets—Sheet 1.
No. 431,880. Patented July 8, 1890.
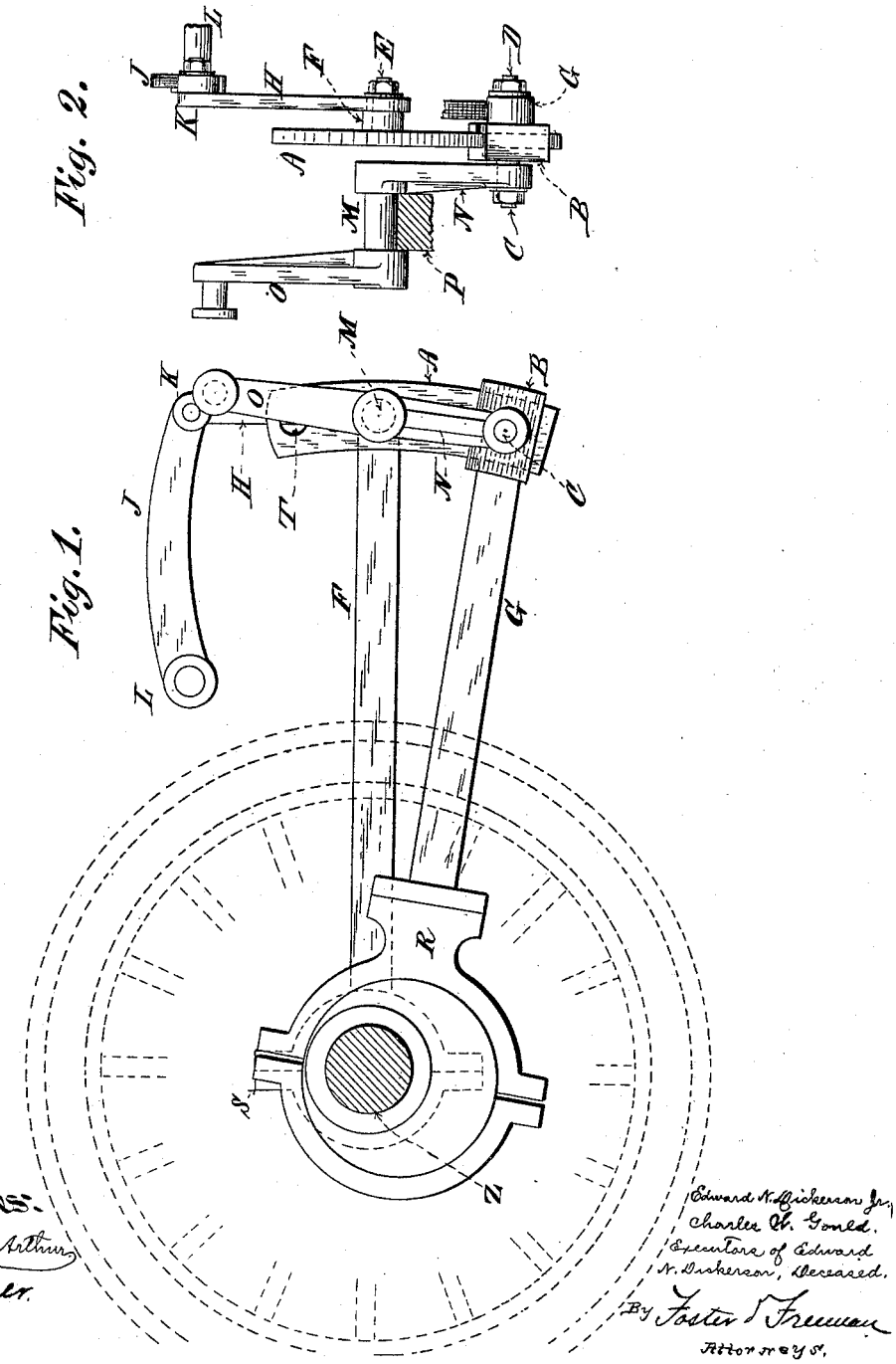

(No Model.) 2 Sheets—Sheet 2.
E. N. DICKERSON, Dec'd.
E. N. DICKERSON, Jr. and C. W. GOULD, Executors.
VALVE GEAR.
No. 431,880. Patented July 8, 1890.
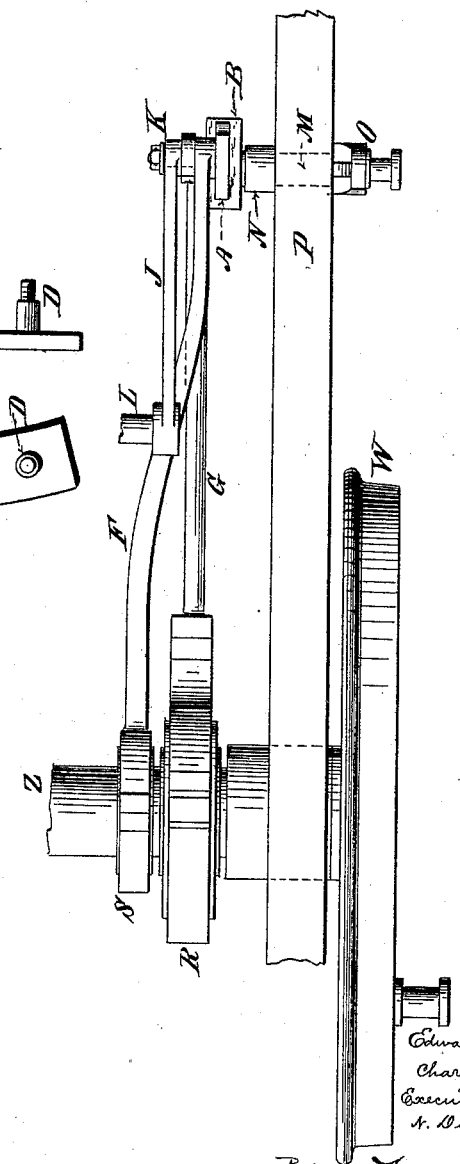

UNITED STATES PATENT OFFICE.

EDWARD N. DICKERSON, JR., AND CHARLES W. GOULD, OF NEW YORK, N. Y. EXECUTORS OF EDWARD N. DICKERSON, DECEASED.

VALVE-GEAR.

SPECIFICATION forming part of Letters Patent No. 431,880, dated July 8, 1890.

Application filed February 19, 1890. Serial No. 341,001. (No model.)

*To all whom it may concern:*

Be it known that EDWARD N. DICKERSON, deceased, late a citizen of the United States, and a resident of New York city, county, and State, did during his lifetime invent certain new and useful Improvements in Valve-Gears, of which the following is a full, true, and exact description, reference being had to the accompanying drawings.

This invention relates to an improved valve-gear motion for driving the valves, especially of steam-engines, and is designed as a substitute for the ordinary link-motion in ordinary use upon locomotives. By it but one eccentric is employed, the device which takes the place of the ordinary link having a fixed bearing upon a radius-bar.

This invention will be readily understood from the accompanying drawings, in which—

Figure 1 represents a longitudinal elevation; Fig. 2, a lateral elevation; Fig. 3, a plan view; Fig. 4, details of the link; and Fig. 5, a section through the link and slide, showing the relations of the pins.

The link A consists of an arc-shaped piece of metal, which may be solid, but by preference, for the sake of lightness, is provided with holes T. It has, with reference to the driving-shaft Z, a fixed and a movable point of attachment, its fixed point of attachment being the length of the radius-bar F, around which the link vibrates, being so caused to vibrate by the reciprocation of the eccentric-rod G, driven from the eccentric R on the shaft Z. The radius-bar F is carried by the strap S, capable of rotating around the shaft Z, but carried upon a circular bearing, and therefore not driven from an eccentric. This radius-bar F is permanently attached to the link by a bearing surrounding pivot E on said link, the eccentric-rod G engaging with pivot D toward the end of the link. The link itself is supported and adjusted by lifter H, which engages on the pivot E, as clearly shown in Fig. 2, the lifter H, pivoted at K, being adjusted vertically by the lever J, which is raised and lowered from the adjustable shaft L, carried in fixed bearings. (Not shown.) The rotation of the shaft L therefore raises and lowers the link A, which is permitted to be raised and lowered by reason of the fact that the eccentric-rod and radius-bar are both capable of rotation around the shaft Z. It is obvious, therefore, in the operation of the machine that the vibration of the link is constant and uniform at all periods of its adjustment. The motion of the link to the valve is communicated through the rock-shaft M, pivoted in a fixed support, as shown, in the side frame of the engine at P, the driven arm N of which is operated from the link communicating its motion through the rock-shaft M to driven arm O. The arm N of the rock-shaft M is pivoted to a slide B, the shape of which is clearly shown in Fig. 5, the pivot C, with which the arm N engages, being fast to the slide B. The slide B fits the link A, but does not surround the same, having an opening between its ends, through which the pivots E D and their bearings may freely pass. The slide B is therefore capable of vibration around its pivot C, but is not vertically adjusted, excepting so far as is due to the movement of the arm N.

As shown, the device is applied to a locomotive having a driving-wheel W, but is manifestly applicable to any analogous valve-gear.

The operation of this device is readily understood. By simply adjusting the lifting-lever J the position of the link A in the slide B is determined. As shown in Fig. 1, the apparatus is at full throw, say, for forward motion. When the link is dropped, so that the centers C and E are coincident, the rock-shaft is at rest. When the link is still further dropped, so that the slide B engages with the part of the link above the center E, then a reverse motion of the rock-shaft occurs and the engine is backing.

What is claimed, and desired to be secured by Letters Patent, is—

1. The combination of a driving-shaft, a vibrating link connected to said driving-shaft by a radius-bar, and an eccentric and eccentric-rod and fixed rock-shaft driven from said link by a connection engaging with said link and adjustable thereon, substantially as described.

2. The combination of a driving-shaft, a vibrating link connected to said driving-shaft by a radius-bar, an eccentric and eccentric-rod and fixed rock-shaft driven from said link by a connection engaging with said link and adjustable thereon, and a lifter for adjusting the relation of the link and the slide, substantially as described.

3. The combination of a driving-shaft, a link driven therefrom by an eccentric, and a sliding piece embracing said link and partially surrounding the same and adjustable at different positions on said link, substantially as described.

4. The combination of a driving-shaft, a link vibrated therefrom by a radius-bar, and an eccentric-rod and rock-shaft having a fixed bearing and a slide connecting with said link, and a lifter for adjusting the position of the link in the slide, substantially as described.

5. The combination of the link A, radius-bar T, eccentric-rod G, driving said link, the fixed rock-shaft M, having slotted slide B, engaging with said link, and a lifter H for adjusting said link through the slide B, substantially as described.

In testimony whereof we have signed our names to this specification in the presence of two subscribing witnesses.

E. N. DICKERSON, JR.,
CHARLES W. GOULD,
*Executors of Edward N. Dickerson, deceased.*

Witnesses:
ANTHONY GREF,
HARRY CONTANT.